US006658967B2

(12) United States Patent
Rutkowski et al.

(10) Patent No.: US 6,658,967 B2
(45) Date of Patent: Dec. 9, 2003

(54) CUTTING TOOL WITH AN ELECTROLESS NICKEL COATING

(75) Inventors: Alan Rutkowski, Waunakee, WI (US); Ken Danio, Lodi, WI (US); Ron Smith, Oregon City, OR (US)

(73) Assignee: Aquapore Moisture Systems, Inc., Phoenix, AZ (US)

( * ) Notice: Subject to any disclaimer, the term of this patent is extended or adjusted under 35 U.S.C. 154(b) by 202 days.

(21) Appl. No.: 09/803,260

(22) Filed: Mar. 9, 2001

(65) Prior Publication Data

US 2002/0124413 A1 Sep. 12, 2002

(51) Int. Cl.[7] .................. B21K 11/00; B26B 13/00; B05D 1/18
(52) U.S. Cl. .................. 76/106.5; 30/251; 427/304; 427/305; 427/437; 427/438
(58) Field of Search .................. 76/106.5; 30/251, 30/249, 250; 427/301, 304, 305, 435, 437, 438

(56) References Cited

U.S. PATENT DOCUMENTS

| | | | | | |
|---|---|---|---|---|---|
| 103,873 A | * | 6/1870 | Grover | .................. | 30/250 |
| 164,579 A | * | 6/1875 | Miles | .................. | 76/106.5 |
| 1,577,140 A | * | 3/1926 | Mitchell | .................. | 30/250 |
| 2,368,906 A | | 2/1945 | Westman | .................. | 30/190 |
| 2,900,722 A | | 8/1959 | Weisenburger | .................. | 30/238 |
| 3,607,353 A | * | 9/1971 | Abu-Isa | .................. | 427/306 |
| 3,857,724 A | * | 12/1974 | Bakos | .................. | 427/438 |
| 4,007,524 A | * | 2/1977 | Hannes et al. | .................. | 30/266 |
| 4,143,618 A | * | 3/1979 | Del Vecchio | .................. | 118/603 |
| 4,152,164 A | * | 5/1979 | Gulla et al. | .................. | 106/1.27 |
| 4,473,602 A | * | 9/1984 | Puligandla et al. | .................. | 427/305 |
| 4,483,711 A | * | 11/1984 | Harbulak et al. | .................. | 106/1.22 |
| 4,695,489 A | * | 9/1987 | Zarnoch et al. | .................. | 427/438 |
| 4,780,342 A | * | 10/1988 | LeBlanc, Jr. | .................. | 427/443.1 |
| 4,789,484 A | * | 12/1988 | Ying et al. | .................. | 210/721 |
| 4,858,324 A | * | 8/1989 | Wiech, Jr. | .................. | 30/357 |
| 5,243,762 A | * | 9/1993 | Orthey | .................. | 30/254 |
| 5,258,061 A | * | 11/1993 | Martyak et al. | .................. | 106/1.22 |
| 5,301,431 A | * | 4/1994 | Cera | .................. | 30/254 |
| 5,338,342 A | * | 8/1994 | Mallory, Jr. | .................. | 106/1.22 |
| 5,397,599 A | * | 3/1995 | Chao et al. | .................. | 427/306 |
| 5,419,047 A | * | 5/1995 | Farzin-Nia | .................. | 30/254 |

(List continued on next page.)

FOREIGN PATENT DOCUMENTS

| | | | | |
|---|---|---|---|---|
| EP | 0 582 411 A2 | 7/1993 | .......... | C23C/18/36 |
| GB | 2 081 176 A | 3/1981 | .......... | B23D/61/00 |
| GB | L075855 | 7/1997 | | |
| RU | 2091502 C1 | 10/1996 | .......... | C23C/18/36 |

OTHER PUBLICATIONS

Article from Metal Finishing, Sep. 1995; Electroless Plating Process; Developing Technologies for Electroless Nickel, Palladium, and Gold, by Don Baudrand and Jon Bengston, MaDermid, Inc., Waterbury, Conn.
Article from PC FAB, Aug. 1985; Electroless Nickel Plating.

Primary Examiner—Allan N. Shoap
Assistant Examiner—Jason Prone
(74) Attorney, Agent, or Firm—Foley & Lardner

(57) ABSTRACT

A cutting tool comprising a metal plate having a central aperture, a forwardly extending blade and a rearwardly extending tang having a second aperture offset from the central aperture, wherein the plate is coated with an electroless nickel layer. Also included is a first elongated member comprising a first handle terminating at a distal end by a jaw and a second elongated member comprising a second handle. The first and second members are pivotally connected to the plate at the central and second apertures by couplers respectively, so that the blade and jaw pivotably move in response to pivotable movement of the first and second members about the coupler in the central aperture.

6 Claims, 3 Drawing Sheets

U.S. PATENT DOCUMENTS

| | | | | |
|---|---|---|---|---|
| 5,426,857 A | | 6/1995 | Linden | 30/262 |
| 5,454,165 A | * | 10/1995 | Thompson et al. | 30/249 |
| 5,511,314 A | * | 4/1996 | Huang | 30/251 |
| 5,570,510 A | | 11/1996 | Linden | 30/250 |
| 5,578,187 A | | 11/1996 | Zitko et al. | 205/191 |
| 5,621,974 A | * | 4/1997 | Rose et al. | 30/260 |
| 5,636,443 A | * | 6/1997 | Linden | 30/134 |
| 5,689,888 A | * | 11/1997 | Linden | 30/250 |
| 5,695,510 A | * | 12/1997 | Hood | 606/169 |
| 5,697,159 A | | 12/1997 | Linden | 30/250 |
| 5,753,304 A | * | 5/1998 | Tung | 427/304 |
| 5,843,538 A | * | 12/1998 | Ehrsam et al. | 427/601 |
| 5,910,340 A | * | 6/1999 | Uchida et al. | 427/437 |
| 5,950,314 A | * | 9/1999 | Chang | 30/244 |
| 6,020,021 A | | 2/2000 | Mallory, Jr. | 427/98 |
| 6,045,866 A | | 4/2000 | Chuang | 427/304 |
| 6,106,927 A | | 8/2000 | Zhong et al. | 428/141 |
| 6,156,218 A | * | 12/2000 | Okubo et al. | 216/13 |
| 6,245,389 B1 | * | 6/2001 | Horikawa et al. | 427/438 |
| 6,301,787 B2 | * | 10/2001 | Mock | 30/262 |

* cited by examiner

CUTTING TOOL WITH AN ELECTROLESS NICKEL COATING

FIELD OF THE INVENTION

The present invention relates generally to cutting devices, and more particularly to a cutting tool having an electroless nickel layer.

BACKGROUND OF THE INVENTION

Cutting devices that are used to cut or prune branches and limbs from various plant materials typically are hand held and have elongated members or handles disposed for cooperative engagement about a pivotable joint. Similar cutting tools are used for cutting cloth and paper, such as scissors. In particular, pivoted tools, such as pruning snips or shears, grass shears, tree pruners, and the like generally comprises two elongated members typically made of stamped or forged metal or other suitable metal disposed for cooperative engagement about the pivotable joint. Typically, each member includes a jaw in the front end portion thereof, an opposing tang, and a pair of handles connected to the jaw and tang.

In the case of conventional pivoted pruners, when cutting a branch, the cutting force applied to the branch is not constant during the cutting process. Typically, the cutting force need is at its greatest a little after the cutting blade reaches the middle of the branch or object being cut. The typical conventional pruners or scissors or shears have a simple scissors-like mechanism with one rivet connecting the handles and the cutting jaws of the pruner. Various arrangements have been adapted to improve the transmission of the force imparted by the operator's hand or by a machine to the cutting blades such as use of a power lever, or gears or links.

In the known scissors-like pruner construction, as the tool is used, the blades lose their sharpness and become dull. Such condition requires more force to effect the desired goal of cutting the branches or other plant material. Also, a dull cutting tool causes ragged cuts which are bad for the plant being pruned. Various coatings, treatment processes and metals have been used to improve the cutting wearability and durability of the cutting tools. However, after a period of use, the coatings tend to wear off or be eroded during the cutting process or become corroded and dull or corroded blades require more force to cut a given branch. Consumers typically don't know how to sharpen or replace dull blades. As a result the tool is not used or thrown away.

Thus, there is a need for a cutting device, that provides an extended period of use without becoming dull or requiring 50% more force to cut with than the initial cut made by a new tool. There is also a need for a cutting device that will not corrode or lose an applied coating that reduces friction or prevents its blades from becoming dull.

SUMMARY OF THE INVENTION

The present invention provides a method for making a cutting tool of the type having a jaw cooperable with a blade actuated by a pair of elongated members made of moldable material. The first member of this cutting tool comprises a first handle terminating at a distal end by the jaw, the second elongated member comprising a second handle, the first and second members being pivotably connected to the metal. The method comprising the steps of applying an electroless nickel coating to the metal plate having the blade. Then positioning into the mold a metal plate having the blade extending forwardly and a rearwardly extending tang with the metal plate having a central aperture. Then molding the first handle with the forwardly extending jaw and molding the second handle onto the tang of the metal plate. Then, coupling the first member to the metal plate with the coupler through the central aperture. Another embodiment of the method includes the step of grinding one of a bevel and an edge on the blade of the cutting tool.

An additional embodiment of the method provides that the step applying an electroless nickel coating includes the steps of cleaning the metal plate in a sodium hydroxide solution, cleaning the metal plate with an alkaline electro cleaner, rinsing the metal plate in a water bath, descaling the metal blade in a hydrochloric acid, rinsing the metal plate in a second water bath, cleaning the metal plate with a second alkaline electro cleaner, rinsing the metal plate in a third water bath, bathing the metal blade in sodium bisulfate, rinsing the metal blade in a fourth water bath and then immersing the metal blade in a solution of nickel sulfate and hypo phosphate for a predetermined time period, wherein an electroless nickel layer is deposited on the cutting tool.

DETAILED DESCRIPTION OF THE PREFERRED EMBODIMENTS

Figure 1:
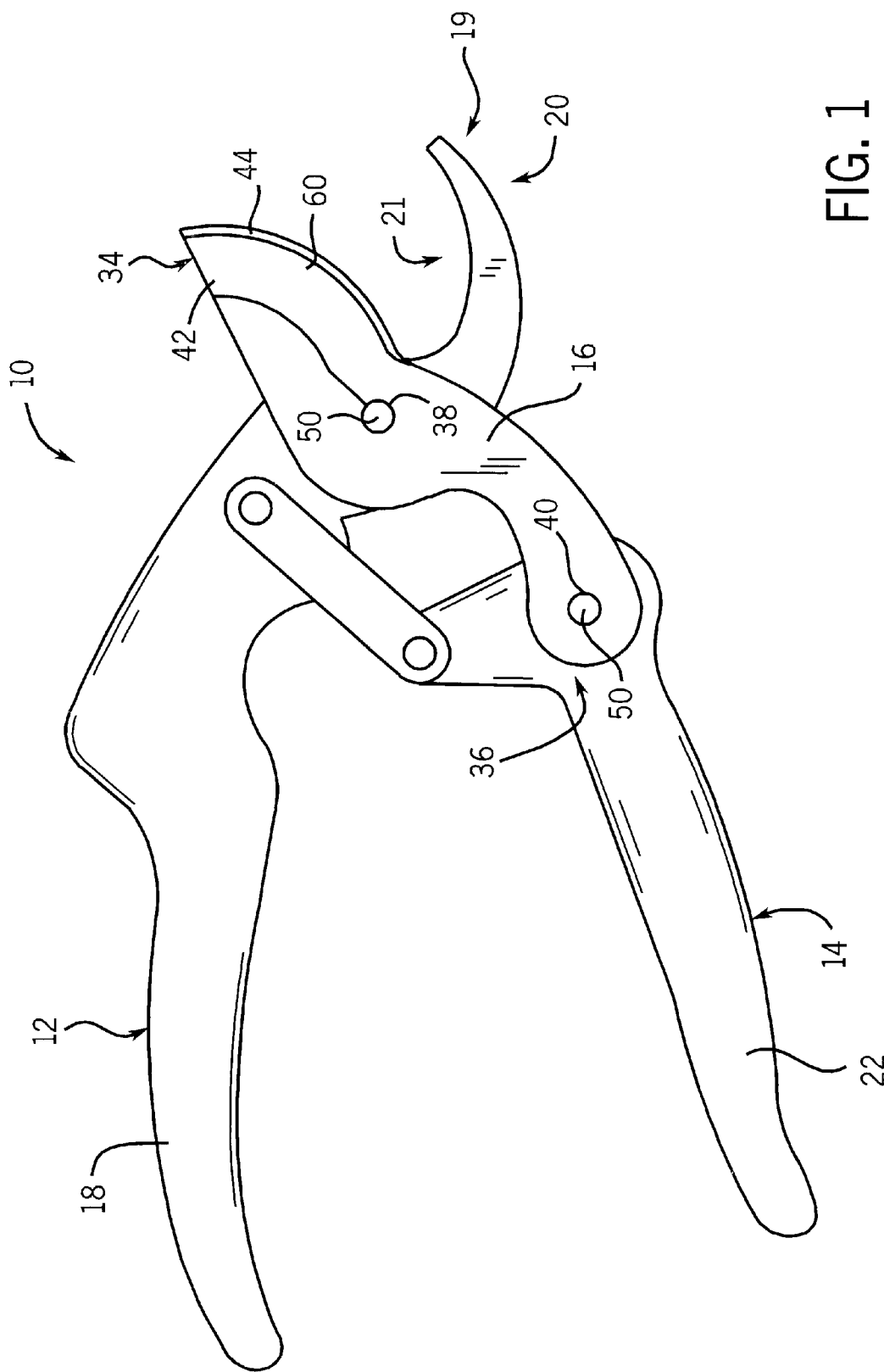
FIG. 1 is a side plan view of an exemplary embodiment of a cutting tool having an electroless nickel layer on the metal plate.

The invention relates to pivoted cutting tools having elongated members disposed for cooperative engagement upon at least one pivotable joint wherein a force applied to the handles of the tool is transmitted to the jaws engaging the work piece to be cut. A typical application is a pruner, grass shears, tree pruners or a branch lopper, to cut plant materials such as branches, limbs and stems. Other applications include scissors for cutting paper or cloth. The pivoted cutting tools can be manually operated or powered by a motor.

Referring to the figures, a cutting tool 10 includes a metal plate 16 having a central aperture 38, a forwardly extending blade 34 and a rearwardly extending tang 36 having a second aperture 40 offset from the central aperture 38, wherein the plate 16 is coated with an electroless nickel layer 60. The first elongated member 12 comprises a first handle 18 terminating at a distal end 19 by a jaw 20. A second elongated member 14 comprises a second handle 22. The first and second members 12, 14 being pivotably connected to the plate 34 at the central 38 and second 40 apertures by couplers 50, respectively, so that the blade 16 and jaw 20 pivotably move in response to pivotal movement of the first and second members 12, 14, about the coupler 50 in the central aperture 38.

The electroless nickel layer 60 is applied, as described below. In a series of baths, with the electroless nickel being in a solution of nickel sulfate ($NiSO_4$) and hypophosphate.

The conventional method of identifying electroless nickel is by the phosphorus content, (e.g., low phosphorus 2–5%; medium phosphorus 6–9%; and high phosphorus 10–13%). The preferred phosphorus content of the electroless nickel layer 60 for the present invention is the medium phosphorus having a weight percent of phosphorus of about 6% to 9% as deposited on the substrate.

Figure 3:
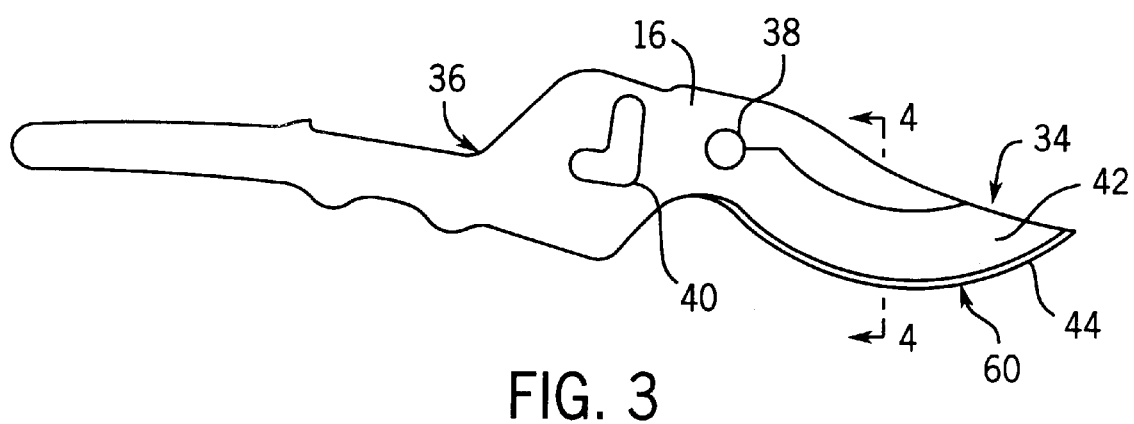
FIG. 3 is a side plan view of an exemplary embodiment of a metal plate having a forwardly extending blade and a rearwardly extending tang, with an electroless nickel layer on the blade.
Figure 4:
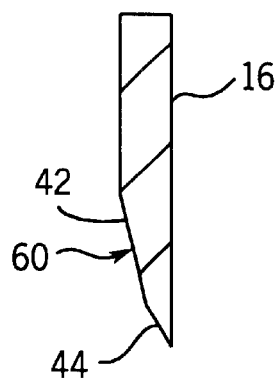
FIG. 4 is a sectional view of the metal plate illustrated in FIG. 3 along the line 4—4.

The blade 34 of the metal plate 16 can be provided with a cutting edge 44 with a bevel 42 on either side or both sides of the cutting edge 44 of the blade 34. The central aperture 38 is sized to receive a coupler or fastener 50 to couple the plate 16 to the first elongated member 12 near the rear end of the jaw 20. The second elongated member 14 is coupled to the plate 16 by a coupler or fastener 50 engaging the second elongated member 14 and the metal plate 16 at the second aperture 40. Another embodiment provides the metal plate 16 with an elongated tang 36, as shown in FIG. 3, to which the second elongated member 14 is molded to the tang 36. A second aperture 40 is configured to receive a coupler 50 that couples a lever or toggle (not shown) to the first elongated member 12.

In FIG. 1, the cutting tool 10 has each of the first and second elongated members 12, 14 pivotably connected to the plate 16 at the central and second apertures, 38, 40 respectfully. The couplers 50 can be a convenient fastener such as a bolt and preferably a rivet. The fastener or coupler 50 may also be provided with a plastic fill in the aperture which forms a threaded hole when the coupler or fastener 50 is inserted into the apertures of the plate 16. It is also contemplated that the coupler 50 can be a metal or other suitable material pin molded into the elongated members 12 and 14 and aligned with a corresponding aperture in the metal plate 16.

Figure 2:
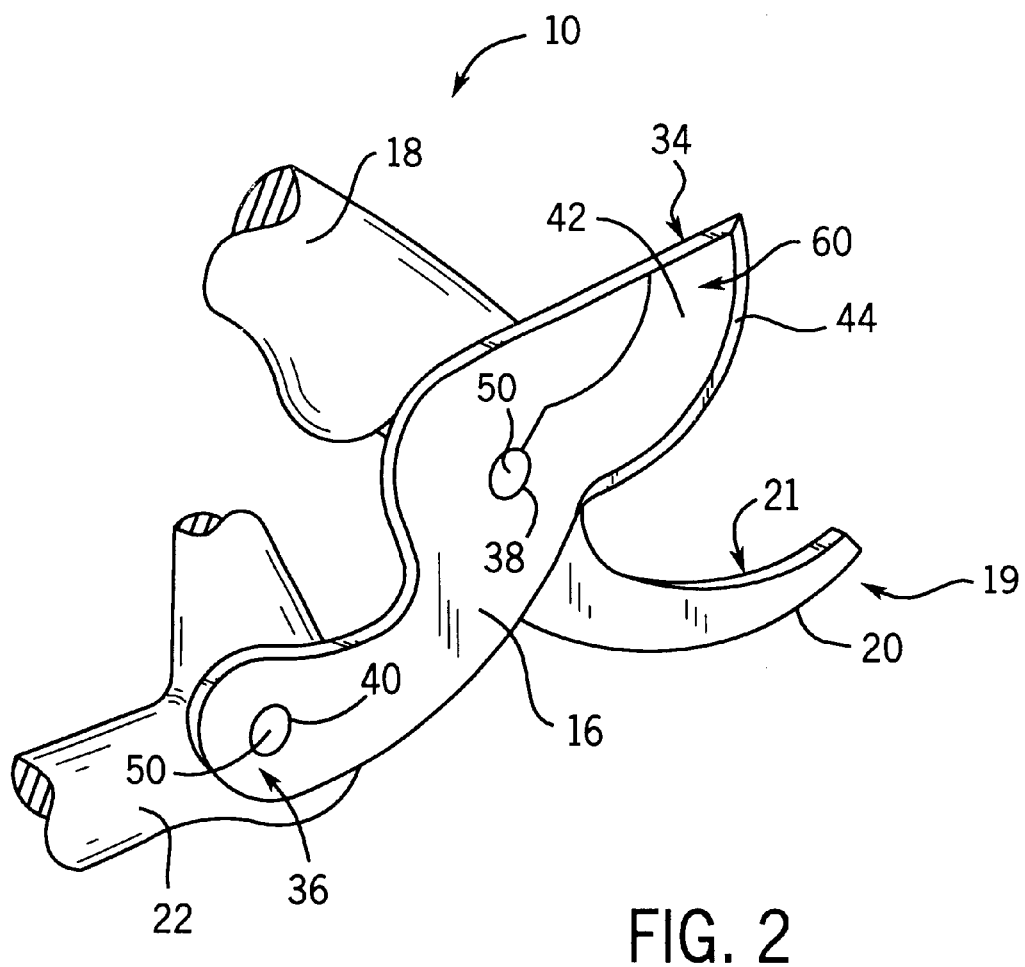
FIG. 2 is a partial, side perspective view of an exemplary embodiment of a cutting tool having an anvil type jaw.

The cutting tool 10 can also be provided with a jaw 20 configured as one of an anvil 21 and a blade 34 as shown in FIGS. 1 and 2. The jaw 20 can also be coated with an electroless nickel layer corresponding to the electroless nickel layer applied to the metal plate 16. The selection of an anvil 21 or the blade 34 configuration for the jaw 20 is made at the time of manufacture and the design of which is determined for the appropriate application for which the cutting tool 10 will be used. The first and second elongated members 12, 14 can be made of a moldable material such as plastic and formed as either a solid or a hollow member. It is also contemplated that the first elongated member 12 can be molded onto the jaw 20 during the fabrication process. It is also contemplated that the first and second elongated members 12, 14, and the plate 16 are all fabricated from metal with the preferred embodiment having at least the first and second elongated members 12 and 14 composed of a moldable material and the plate 16 being metallic.

A method for making a cutting tool 10 of the type having a jaw 20 cooperable with a blade 34 actuated by a pair of elongated members 12, 14 made of moldable material, the first member 12 comprising a first handle 18 terminating at a distal end 19 by the jaw 20, the second elongated member 14 comprising a second handle 22 is provided. The first and second members 12, 14 are pivotably connected to a metal plate 16 having the blade 34 about a coupler 50. The method comprises the steps of applying an electroless nickel coating 60 to the metal plate 16 having the blade 34. Then positioning into a mold the metal plate 16 having the blade 34 extending forwardly and a rearwardly extending tang 36, with the metal plate 16 having a central aperture. Then molding the first handle 18 with the forwardly extending jaw 34 and molding a second handle 22 onto the tang 36 of the metal plate 16, then coupling the first member 12 to the metal plate 16 with the coupler 50 through the central aperture 38.

Another embodiment of the method provides that the electroless nickel coating 60 includes a weight percentage of phosphorus above about 6%. Another method includes the jaw 20 being configured as one of an anvil 21 and a blade 34. The method of making a cutting tool can also include the step of grinding one of a bevel 42 and an edge 44 on the blade 34. The jaw 20 of the first handle 18 can also receive a coating of electroless nickel.

The method of manufacturing the cutting tool 10 can provide that the step applying an electroless nickel coating 60 includes the steps of cleaning the metal plate 16 in a sodium hydroxide solution, then cleaning the plate 16 with an alkaline electro cleaner and rinsing the metal plate 16 in a water bath. Then descaling the metal plate 16 in a hydrochloric acid and rinsing the metal plate 16 in a second water bath. Then cleaning the metal plate 16 with a second alkaline electro cleaner and again rinsing the metal plate 16 in a third water bath. A bath of sodium bisulfate then receives the metal blade 16 and again a fourth water bath rinsing of the metal blade 16 takes place. Finally immersing the metal blade 16 in a solution of nickel sulfate and hypophosphate for a predetermined time period so that the electroless nickel coating 60 is applied to the metal plate 16. The preferred thickness of the electroless nickel is 0.0004 inches plus or minus 0.00005 inches (range 0.00035 to 0.00045 inches). The amount of time that the metal plate is immersed in the nickel sulfate and hypophosphate bath to obtain the desired layer of thickness depends on the temperature of the bath, the purity of the bath and other such factors which are well known to those ordinarily skilled in the relevant art. The time period may vary from about 45 minutes to about 90 minutes.

The method of making the cutting tool 10 can also include the steps of prior to the molding the members 12, 14 positioning two removable cores into cavities of the mold configured to form the handles so that the members are provided with hollow handles when the cores are removed from the handles after the molding process.

It should be apparent that there has been provided in accordance with the present invention a cutting tool with an electroless nickel layer formed on the cutting surfaces and that the invention is not limited to the specific forms described. For example, cutting tools in accordance with the invention can be provided with one or more power levers with each power lever mounted on one side of each pair of first and second elongated members, thereby sandwiching the elongated members between the two power levers. The cutting tool can also be configured with a gearing arrangement to facilitate the transmission of force from the handles to the cutting blades. The cutting tool can also be configured with a pair of opposed cutting blades, as in by-pass pruners, instead of a blade cooperating with an anvil as described in one of the preferred embodiments. It is also contemplated that an aesthetically pleasing shroud or skin can be applied to the cutting device which would enclose the power lever, or gears or pivot points and portions of the first and second elongated members and the metal plate. Such other constructions are considered to be within the scope of the claims and these and other substitutions, modifications, changes and omissions may be made in the design in the arrangement of the elements and in the manufacturing steps disclosed herein without departing from the scope of the appended claims.

What is claimed is:

1. A method for making a cutting tool of the type having a jaw cooperable with a blade actuated by a pair of elongated members made of moldable material, the first elongated member comprising a first handle terminating at a distal end by the jaw, the second elongated member comprising a second handle, the first and second elongated members being pivotally connected to a metal plate having the blade about a coupler, the method comprising the steps of:

applying an electroless nickel coating to the metal plate having the blade, wherein the step of applying an electroless nickel coating includes the steps of:

cleaning the metal plate in a sodium hydroxide solution;
cleaning the metal plate with an alkaline electro cleaner;
rinsing the metal plate in a water bath;
descaling the metal blade in a hydrochloric acid;
rinsing the metal plate in a second water bath;
cleaning the metal plate with a second alkaline electro cleaner;
rinsing the metal plate in third water bath;
bathing the metal blade in sodium bisulfate;
rinsing the metal blade in a fourth water bath; and,
immersing the metal blade in a solution of nickel sulfate and hypo phosphate for a predetermined time period;

positioning the metal plate having the blade extending forwardly and a rearwardly extending tang into a mold, the metal plate having a central aperture;
molding the first handle with the forwardly extending jaw;
molding the second handle onto the tang of the metal plate;
coupling the first member to the metal plate with a coupler through the central aperture.

2. The method of claim 1, wherein the electroless nickel coating a weight percent of phosphorous above about 6 percent.

3. The method of claim 1, including the step of grinding one of a bevel and an edge on the blade.

4. The method of claim 1, wherein the molding step also comprises, prior to molding the members, positioning two removable cores into cavities of the mold configured to form the handles so that the members are provided with hollow handles.

5. The method of claim 1, wherein the jaw is configured as one of an anvil and a blade.

6. The method of claim 5, including the step of applying an electroless nickel coating to the jaw.

* * * * *

UNITED STATES PATENT AND TRADEMARK OFFICE
CERTIFICATE OF CORRECTION

PATENT NO. : 6,658,967 B2
DATED : December 9, 2003
INVENTOR(S) : Alan Rutkowski, Ken Danio and Ron Smith It is certified that error appears in the above-identified patent and that said Letters Patent is hereby corrected as shown below:

<u>Column 6,</u>
Line 11, please insert -- includes -- after "coating"

Signed and Sealed this

Twenty-seventh Day of July, 2004

JON W. DUDAS
*Acting Director of the United States Patent and Trademark Office*